Patented Dec. 12, 1944

2,365,075

UNITED STATES PATENT OFFICE 2,365,075

MILLING MACHINE

Fred A. Hassman, Cincinnati, Ohio, assignor to The Cincinnati Milling Machine Co., Cincinnati, Ohio, a corporation of Ohio Application September 8, 1941, Serial No. 410,013

8 Claims. (Cl. 90—22)

This invention relates to improvements in milling machines and particularly to the control of actuation thereof.

One of the principal objects of the present invention is the provision of improved transmission mechanism for insuring smooth operation of the machine under varying operating conditions.

A further object of the invention is the provision of improved controllable mechanism for reduction of possible backlash in the drive mechanism of the machine during a tooling operation and of means for selective determination of the primary directional effectiveness of said mechanism dependent on the particular manner in which the machine is employed.

A further object of the present invention is the provision in connection with a mechanism for the purpose above specified of interconnected means for automatically reversing the directional effectiveness of the backlash eliminating mechanism in accordance with reversals in directional actuation of the machine transmission, together with coupled means for rendering the backlash restraint mechanism ineffective during potential rapid actuation of the transmission.

An additional object of the present invention is the provision of a unitary self-contained actuating and control mechanism which shall be readily applicable to or embodiable in a knee or other shiftable unit of a milling machine or like machine tool for effecting both power actuation of a translatable member and hydraulic control of the various functionings thereof.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

In the drawings in which like reference numerals indicate like or similar parts:

Figure 1:
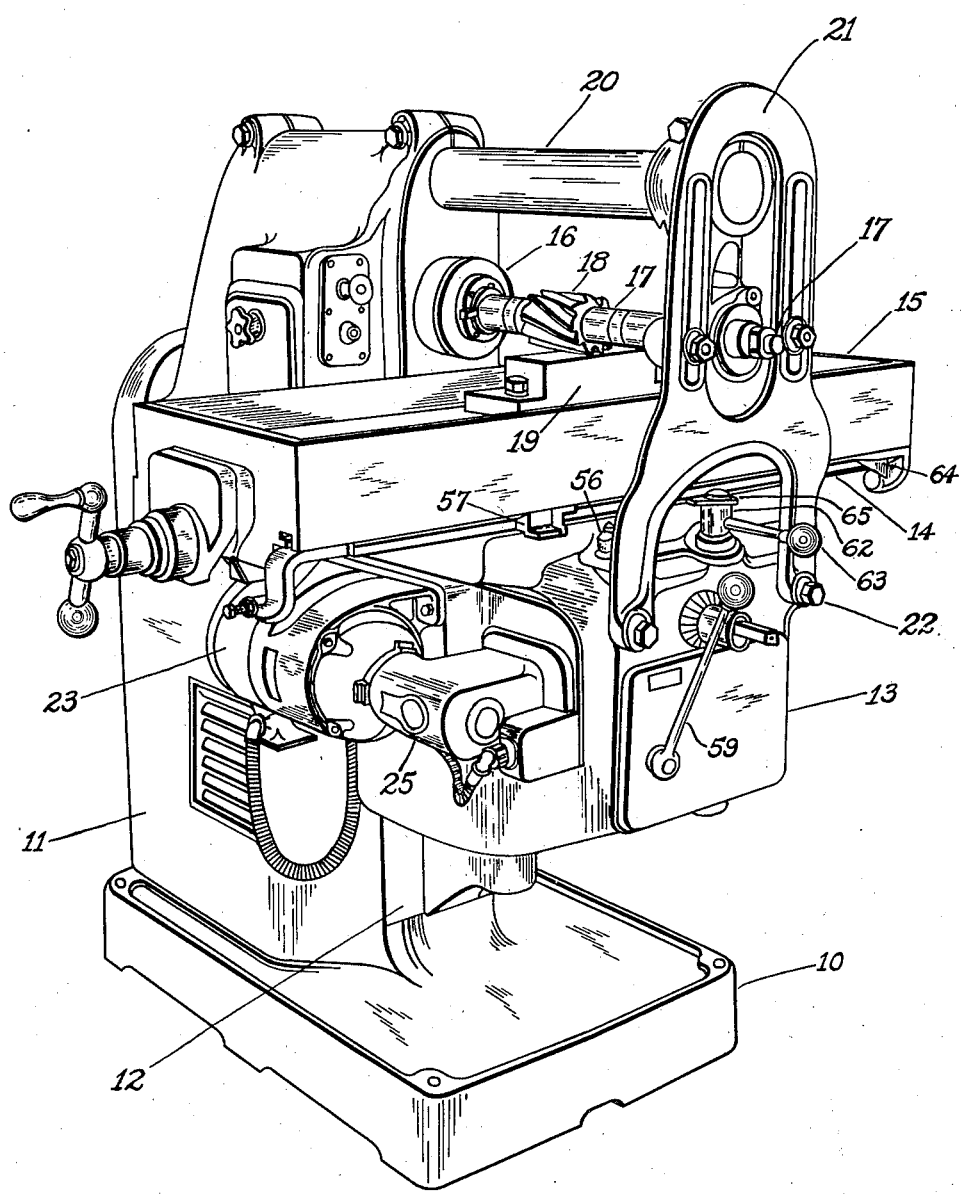
Figure 1 is a perspective view of a milling machine constructed in accordance with and embodying the present invention.

In the drawings the numeral 10 designates the base of a milling machine having rising therefrom the column unit 11 provided with ways 12 for the vertically adjustable knee unit 13 provided on its upper surface with ways 14 for the translatable table or work supporting member 15. Mounted in the column adjacent the table is an adjustable quill 16 supporting the arbor 17 for cutter 18 which is shown in engagement with work piece 19 carried by the table 15. An overarm 20, adjustably mounted in the column, has its outer end engaged in the overarm brace 21 secured as at 22 to the knee 13 for supporting the outer end of the arbor 17 against deflection.

Figure 2:
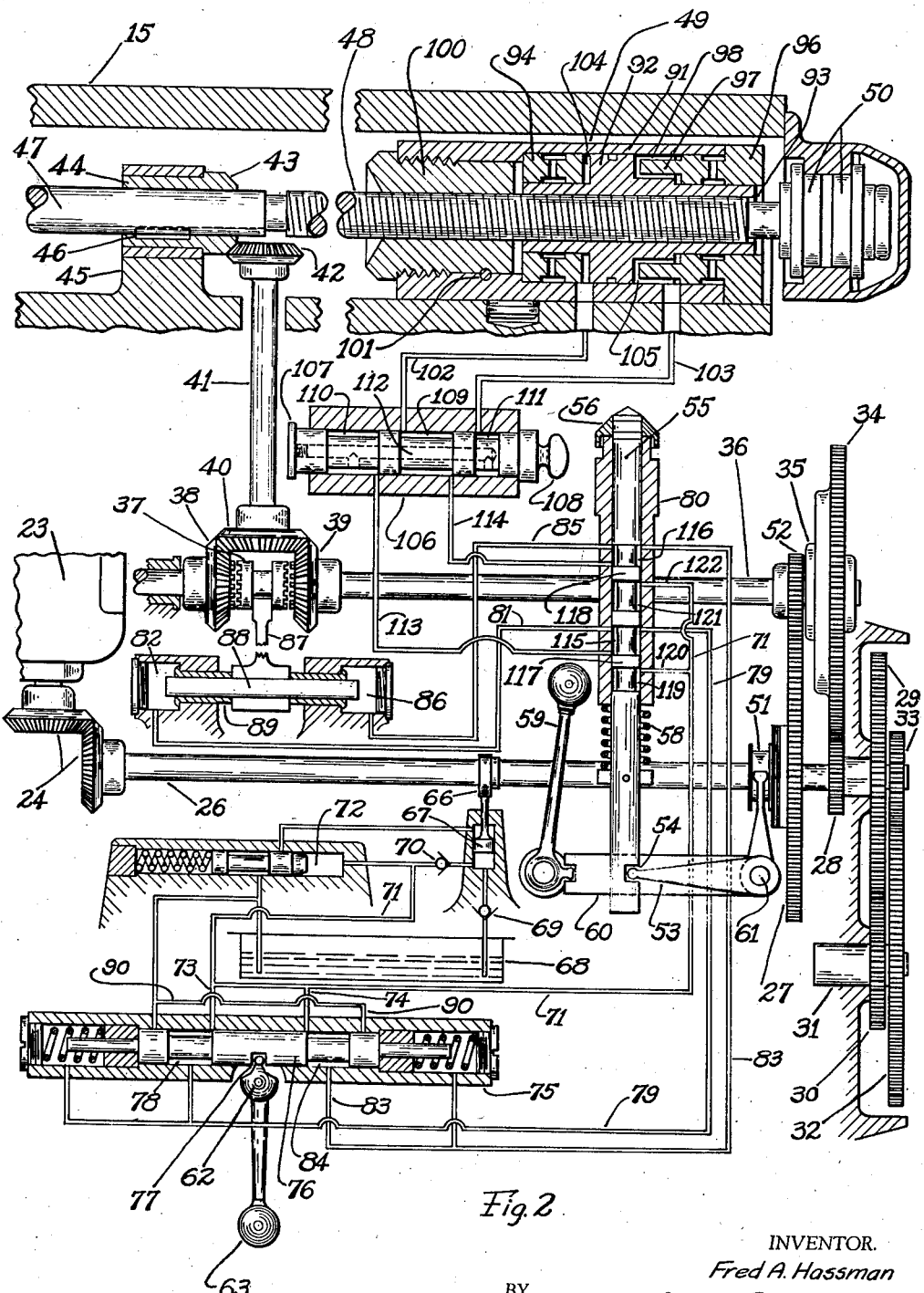
Figure 2 is a diagrammatic view of the entire actuating transmission and controls therefor.

The knee 13 is formed in the conventional manner as a hollow casting or unit providing space therewithin for the transmission elements diagrammatically illustrated in Figure 2. Exteriorly, there is mounted upon the knee the drive motor 23 which through bevel gears 24 contained as in housing 25 serves to actuate the main power shaft 26 which extends transversely of the knee element. This shaft has rotatably mounted thereon the large rapid traverse gear 27 and the couplet comprising the drive pinion 28 and gear 29. Gear 29 meshes with gear 30 on stub shaft 31 which supports large gear 32 meshing with gear 33 on the squared outer end of shaft 26. Power is thus transmitted from shaft 26 through gears 33, 32, 30, 29 and pinion 28 to gear 34 which through overrun clutch 35 serves to actuate table drive shaft 36.

Mounted on shaft 36 is the reverser clutch 37 selectively engageable with bevel pinions 38 and 39 jointly meshing with gear 40 on vertical shaft 41 which extends upwardly of the knee and bears on its upper end bevel gear 42 meshing with the pinion portion 43 of sleeve 44 rotatably secured against axial movement in a bearing portion 45 of the knee. This sleeve is splined as at 46 to the lead screw 47 to effect rotation thereof, the lead screw having a threaded portion 48 interengaged with a nut element designated as an entirety by the numeral 49 carried by the upper face of the knee. The screw has its ends mounted as by anti-friction bearings 50 in the ends of the table 15 for rotation while restrained from axial movement with respect to the table 15.

Additionally, there is splined on shaft 26 clutch 51 for coupling gear 27 in driving relation to the shaft. This gear 27 meshes with gear 52 on shaft 36, the overrunning clutch 35 permitting speeding up of shaft 36 through this latter drive to effect rapid traverse movement of the table when clutch 51 is engaged.

For determining the effective positioning of this clutch there is provided the bell crank shifter 53 having a portion engaged in notch 54 of rapid traverse plunger 55 having a terminal portion 56 engageable by adjustable rapid traverse dogs, such as 57. Spring 58 normally urges the plunger into its lower or depressed position rendering clutch 51 ineffective so that the parts may operate at a feeding rate. The rapid traverse clutch is manually shifted into engaging position by actuation toward the left of lever 59 carried by the front of the knee operating through arm 60 on shaft 61 of bell crank 53 against action of spring 58 which discontinues the rapid traverse effect when the lever is released.

Safety dogs, such as 57, adjustably mounted on table 15, extend in position to engage the plunger when raised automatically to depress it against the manual actuation to prevent the work being brought rapidly into engagement with the cutting tool. The forward portion of the knee is additionally provided with an oscillating plunger 62 controllable as by manual actuation of handle 63 or alternatively by engagement of trip dogs, such as 64, with wings 65 on the plunger for effecting reversal of movement of the table. By reference to Figure 2 it will be noted that shaft 26 is provided with an eccentric 66 actuating the pump piston 67 which draws hydraulic medium from the reservoir 68 through check valve 69 and forces same past check valve 70 into the hydraulic power line 71 of the control mechanism which has coupled in parallel therewith the accumulator 72 limiting the extent of pressure built up and maintaining the pressure condition during the suction stroke of the pump. The conduit or pressure line 71 has a pair of branches 73 and 74 coupled with the casing 75 of the reversing valve plunger 76 which is manually actuable as by the pin and slot connection 77 from lever 63 and plunger 62.

This reversing valve has a groove or cannelure 78 connectable by conduit 79 with the casing 80 of the rapid traverse plunger element 55. Extending from this casing and at all times in pressure conducting relation with conduit 79 is conduit 81 coupled to the left hand cylinder 82 of the reverser mechanism. A second conduit system comprising line 83 communicating with cannelure 84 on the reversing valve extends by way of casing 80 and conduit 85 to the right hand cylinder 86 of the reversing mechanism.

The reversing mechanism proper comprises a shifter arm 87 coupled with the double face clutch element 37 and carried by a rod 88 slidable in the headed sleeve members 89 which are in turn slidably mounted within the terminal portions of the cylinders 82 and 86 respectively.

As illustrated, lever 63 is shown in a neutral or non-feeding position and clutch 37 is similarly disposed. This is due to the fact that in the neutral position of the reversing valve 76 the ports of lines 73 and 74 simultaneously communicate with the respective cannelures 78 and 84 so that pressure exists in both cylinders 82 and 86. This results in inward forcing of both of the sleeves 89 to their limit of inward movement as illustrated, thus centralizing the shifter arm 87. In the event that valve 76 is moved in either direction from its central position, as for example to the right, the central portion of the valve will shut off the pressure flow from conduit 74 to conduit 83 and couple conduit 83 through line 90 to reservoir 68. At the same time pressure connection will be maintained between 73 and 79 by way of 78. This pressure will react on the piston element 88, tending to shift same toward the right while the release of pressure in cylinder 86 will permit free movement of the right hand sleeve 89 so that the reverser clutch 37 may be properly shifted into driving engagement with pinion 39. The couple of the parts is such that the right hand shifting is effected by a left hand movement of handle 63, the relation of the several parts to the drive transmission being such that a suitable rotation of screw 48 will be effected for movement of the table toward the left. It will be understood that the right hand movement of the lever 63 will effect suitable reversal of the various conduit connections and thus coupling of the clutch element 37 for actuation of the table to the right.

In the accurate performance of milling operations it is essential that backlash between the table and its actuator be minimized. In performance of milling operations the cutter 18 may be rotated in either clockwise or counterclockwise direction and the feeding action take place toward either the right or the left. This means that in some instances the work is moving against the direction of rotation of the cutter, tending to hold back the feeding movement, while in other instances the cutter may be working in the direction of feed for what is known as a hook-in cut, accentuating the feeding movement. It is desirable, in either instance, that any possible backlash of either a constant nature or due to irregularities or speeds in the actuating screw or nut of the table be minimized in the direction of cutter thrust so that the nut will be held tightly against the actuating or controlling face of the screw threads.

In the present invention this is effected by forming the block 49 with a cylinder 91 slidably receiving piston 92 which has a central internally threaded bore 93 interfitting with screw 48. Block 94 slidably receives one end of the sleeve which operates, in effect, as a piston rod, and an end block 96, the opposite end of the sleeve. Member 96 is provided with teeth 97 entering inner recesses 98 of the piston element 92 permitting axial movement of the piston with respect to member 49 but preventing rotative movement thereof. Threaded into the left hand portion of member 49 is the main drive nut 100 interfitting with screw 48 and locked in adjusted position with respect to member 49 as by pin 101.

From the foregoing it will be noted that the nut element 100 is rigid or, in effect, unitary with the table support or knee of the machine while the nut 92 has a capacity of limited axial movement with the screw. For control of this movement there are provided conduits 102 and 103 communicating respectively with the cylinder chambers 104 and 105, it being understood that introduction of pressure into either chamber 104 or 105 will effect a corresponding axial urge of the piston 92 and thus of the screw 48 with respect to the fixed nut and knee, thus holding the one face of the screw tightly against its associate element and eliminating backlash therebetween. Conduits 102 and 103 are coupled with selector valve casing 106, containing a valve element 107 actuable as by knob 108. This valve has a central cannelure as at 109 and a pair of terminal cannelures 110 and 111 interconnected as by passage 112. Coupled into the casing 106 in staggered relation to the connection of the conduits 102 and 103 are conduits 113 and 114 extending respectively to the lower and upper portions of the rapid traverse plunger casing 80. It will be understood by reference to the drawings that in the position of valve 107 shown conduit 102 is connected through cannelure 109 with conduit 114, while conduit 103 is coupled through cannelure 111, passage 112 and cannelure 110 with conduit 113, but that movement to the right of the valve will reverse these connections and thus the pressure effects in conduits 113 and 114 as respects chambers 104 and 105.

In the feed position of the rapid traverse control plunger as illustrated in Figure 2 it will be noted that conduit 113 is coupled by cannelure 115 with the conduit system 79—81 so that the pressure condition existing in cylinder 82 will likewise exist in chamber 105.

Correspondingly, conduit 114 is coupled by cannelure 116 with conduit system 83—85 so that the same pressure condition exists in this conduit as in cylinder 86 and thus correspondingly in cylinder 104.

From the foregoing it will be noted that when the reversing valve is in its neutral position pressure is coupled with both cylinders 82 and 86 to effect neutralization of the reverser and at the same time pressure is coupled with both cylinders 104 and 105 so that a balanced pressure condition exists as respects the piston 92, and there is no axial urge of screw 48 in one direction or another with respect to nut 100, thus permitting of free manual rotation of the screw for adjustment purposes.

It is noted, however, that movement of valve 76 in either direction from its neutral position will release the pressure from either cylinder 82 or cylinder 86 so that movement of the reverser will be effected by the opposite cylinder and will, at the same time, release the pressure in one or the other of cylinders 104 or 105 depending on the setting of the selector valve 107 so that when the machine is feeding there will be a positive hydraulic pressural urge of piston 92 in predetermined direction with respect to the feed, eliminating possibility of backlash between screw 48 and nut 100.

When the plunger 55 is upwardly actuated to effect a rapid traverse movement spool 117 will rise into the space between conduit connections 81 and 113 and spool 118 into the space between conduit connections 85 and 114, thus blocking off the pressure control connections between the reversing valve controlled conduits for directional determination and the conduits determinative of pressural reactions on the backlash mechanism. This movement of the rapid traverse plunger element, however, will serve respectively to couple conduit 113 by way of cannelure 119 with branch 120 of pressure conduit 71 and conduit 114 by way of cannelure 121 with branch 122 of pressure conduit 71. By this movement pressure is then equally and correspondingly coupled through the selector valve with both conduits 102 and 103 irrespective of the position of either the selector valve or the reversing valve.

This insures application of balanced pressure on opposite sides of piston 92, tending to render the same free floating and relieving all endwise reaction of the hydraulic means on screw 49 as respects nut 100, thus facilitating free rotation of the screw for rapid traverse purposes. It will be understood that the downward movement of the rapid traverse plunger from its rapid traverse to feed position automatically restores the pre-existing conduit connections as respects the backlash eliminating piston 92.

From the foregoing description taken in connection with the accompanying drawings it will be noted that there has been provided in conjunction with a supporting element such as the knee of a milling machine having a table mounted thereon, a unitary driving and controlling mechanism carried as an entirety by the supporting element including a motor member mechanically effective through suitable gearing arrangements for effecting feed and rapid traverse movements of the table or translatable element in both directions, together with a hydraulic control mechanism having a pressure pump operated by the motor, a backlash eliminating device, and a valving mechanism adjustable for control of the reactions of the hydraulic pressure medium on the several parts. Said valving mechanism, it will be noted, includes a first means for determining directional actuation of the table with respect to the knee, a second means serially coupled therewith for determining the corresponding or opposite directional reaction of the hydraulic medium on the backlash eliminator incorporated within the drive and an additional means adjustable to control the coupling of the hydraulic medium, either serially with or exclusive of certain of the valve mechanisms to render the backlash device effective during certain actuations of the table and ineffective during other actuations thereof.

What is claimed is:

1. In a transmission of the character described, the combination with a mechanical feed rapid traverse drive including a rotatable final element and a member operatively associated therewith for relative translation upon rotation of the parts, of an anti-backlash mechanism including a cylinder having a piston intermediately movable therein and connected with one of said final drive transmission elements for effecting opposite relative directional urges of the parts dependent on the direction of actuation of the piston, a source of hydraulic pressure medium, conduits intervening said source and the piston and including valve members for determining directional urge of the hydraulic medium as respects the piston, a feed-rapid traverse selector, a valve means in the hydraulic conduit system coupled with the selector for actuation thereby, said valve means having portions for effecting corresponding hydraulic connections at opposite sides of the backlash eliminating piston when the selector is in rapid traverse position whereby to nullify the end thrust effect of the piston during rapid traverse operation.

2. A machine of the character described, including a support, an element translatable on the support, means including relatively rotatable nut and screw elements for effecting translation of the parts, a power transmission for effecting different rates of actuation of the nut and screw mechanism including a rate selector, a hydraulically actuable reversing mechanism, a backlash eliminating mechanism including a reversable hydraulic motor, a source of hydraulic medium under pressure, a reversing valve shiftable to reverse the effect of the hydraulic medium as respects the reverser and a control valve having a first series of conduits coupled with the reversing valve, a second series of conduits directly connected with the source of hydraulic medium and a third series of conduits connected with the hydraulic backlash motor, said control valve having portions alternately positionable to connect the first or second series of conduits with the third series of conduits to determine the reaction of the hydraulic medium on the backlash eliminating motor either inclusive or exclusive of the direction determining valve.

3. A machine of the character described, including a support, an element translatable on the support, means including relatively rotatable nut and screw elements for effecting translation of the parts, a power transmission for effecting different rates of actuation of the nut and screw mechanism including a rate selector, a hydraulically actuable reversing motor, a backlash eliminating mechanism including a reversable hydraulic motor, a source of hydraulic medium under pressure, a first reversing valve shiftable to reverse the effect of the hydraulic medium as respects the reversing motor and a control valve having a first series of conduits coupled with the reversing valve, a second series of conduits directly connected with the source of hydraulic medium and a third series of conduits connected with the hydraulic backlash motor, said control valve having portions alternately positionable to connect the first or second series of conduits with the third series of conduits to determine the reaction of the hydraulic medium on the backlash eliminating motor either inclusive or exclusive of the direction determining valve, and operative connections between the rate selector and said valve for effecting the respective positionings thereof in accordance with the movement of the rate selector.

4. A machine of the character described, including a support, an element translatable on the support, means including relatively rotatable nut and screw elements for effecting translation of the parts, a power transmission for effecting different rates of actuation of the nut and screw mechanism including a rate selector, a hydraulically actuable reversing motor, a backlash eliminating mechanism including a reversable hydraulic motor, a source of hydraulic medium under pressure, a first reversing valve shiftable to reverse the effect of the hydraulic medium as respects the reversing motor and a control valve having a first series of conduits coupled with the reversing valve, a second series of conduits directly connected with the source of hydraulic medium and a third series of conduits connected with the hydraulic backlash motor, said control valve having portions alternately positionable to connect the first or second series of conduits with the third series of conduits to determine the reaction of the hydraulic medium on the backlash eliminating motor either inclusive or exclusive of the direction determining valve, and a reversing valve in the third set of conduits intervening the hydraulic pressure control valve and the backlash eliminating motor for reversing the effect of the medium as respects the backlash motor.

5. A machine of the character described, including a support, an element translatable on the support, means including relatively rotatable nut and screw elements for effecting translation of the parts, a power transmission for effecting different rates of actuation of the nut and screw mechanism including a rate selector, a hydraulically actuable reversing mechanism, a backlash eliminating mechanism including a reversible hydraulic motor, a source of hydraulic medium under pressure, a reversing valve shiftable to reverse the effect of the hydraulic medium as respects the reverser and a control valve having a first series of conduits coupled with the reversing valve, a second series of conduits directly connected with the source of hydraulic medium and a third series of conduits connected with the hydraulic backlash motor, said control valve having portions alternately positionable to connect the first or second series of conduits with the third series of conduits to determine the reaction of the hydraulic medium on the backlash eliminating motor either inclusive or exclusive of the direction determining valve, and operative connections between the rate selector and said valve for effecting the respective positionings thereof in accordance with the movement of the rate selector, and means on the translatable member for effecting positive shifting of the hydraulic medium selecting valve and its associate parts.

6. A directionally effective backlash eliminating mechanism for a machine tool drive transmission including a reversible hydraulic backlash eliminator motor, a source of hydraulic medium, first and second reversing valves intervening the source of hydraulic medium and the motor, a selector valve intervening the reverser valves having a first position effecting a serial coupling of the valves and a second position effecting a coupling of the hydraulic medium to the second valve exclusive of the first reversing valve to neutralize the hydraulic reaction of the medium on the backlash motor.

7. A machine of the character described, including a support, an element translatable on the support, means including relatively rotatable nut and screw elements for effecting translation of the parts, a power transmission for effecting different rates of actuation of the nut and screw mechanism including a rate selector, a hydraulically actuable reversing motor, a backlash eliminating mechanism including a reversible hydraulic motor, a source of hydraulic medium under pressure, a first reversing valve shiftable to reverse the effect of the hydraulic medium as respects the reversing motor and a control valve having a first series of conduits coupled with the reversing valve, a second series of conduits directly connected with the source of hydraulic medium and a third series of conduits connected with the hydraulic backlash motor, said control valve having portions alternately positionable to connect the first or second series of conduits with the third series of conduits to determine the reaction of the hydraulic medium on the backlash eliminating motor either inclusive or exclusive of the direction determining valve, and a reversing valve in the third set of conduits intervening the hydraulic pressure control valve and the backlash eliminating motor for reversing the effect of the medium as respects the backlash motor, said first reversing valve having portions effective in an intermediate position to connect the hydraulic pressure medium simultaneously with both activatable portions of the hydraulic motors controlled thereby.

8. In a milling machine having a column, a knee mounted on the column and a table reciprocably mounted on the knee, the combination of a transmission and control mechanism for the table contained entirely in the knee and including a prime mover, a feed-rapid traverse transmission coupling the prime mover for actuation of the table and including a backlash eliminating device, said transmission including a reverser and a directional control lever therefor, motion transmitting connections responsive to the direction of movement of said lever to render said eliminator effective in accordance with the direction of table travel, a rapid traverse clutch for said transmission, a control lever for engaging said clutch, resiliently operable means for maintaining said clutch and lever in an inoperative position, and means controlled by said lever upon movement to a rapid traverse position for neutralizing the effect of the directional control lever upon said eliminator whereby it is ineffective during rapid traverse movement of the table.

FRED A. HASSMAN.